United States Patent
Al-Buraiki et al.

(10) Patent No.: US 9,146,561 B2
(45) Date of Patent: Sep. 29, 2015

(54) ROBOTIC LEADER-FOLLOWER NAVIGATION AND FLEET MANAGEMENT CONTROL METHOD

(71) Applicants: KING FAHD UNIVERSITY OF PETROLEUM AND MINERALS, Dhahran (SA); KING ABDULAZIZ CITY FOR SCIENCE AND TECHNOLOGY, Riyadh (SA)

(72) Inventors: Omar Salem Al-Buraiki, Dhahran (SA); Sami A. El Ferik, Dhahran (SA)

(73) Assignees: KING FAHD UNIVERSITY OF PETROLEUM AND MINERALS, Dhahran (SA); KING ABDULAZIZ CITY FOR SCIENCE AND TECHNOLOGY, Riyadh (SA)

( * ) Notice: Subject to any disclaimer, the term of this patent is extended or adjusted under 35 U.S.C. 154(b) by 36 days.

(21) Appl. No.: 14/095,995

(22) Filed: Dec. 3, 2013

(65) Prior Publication Data
US 2015/0153738 A1 Jun. 4, 2015

(51) Int. Cl.
*G06F 19/00* (2011.01)
*G05D 1/02* (2006.01)

(52) U.S. Cl.
CPC .................... *G05D 1/0295* (2013.01)

(58) Field of Classification Search
CPC .............. G05D 2201/0216; G05D 1/0246; G05D 1/0265; G08G 1/0104; G08G 1/096716; G08G 1/096775
USPC .......... 701/23, 24, 25, 26, 117, 120, 301, 300; 340/961, 435, 436; 342/455, 29, 458, 342/457
See application file for complete search history.

(56) References Cited

U.S. PATENT DOCUMENTS

| | | | |
|---|---|---|---|
| 7,211,980 B1* | 5/2007 | Bruemmer et al. | 318/587 |
| 8,234,067 B2* | 7/2012 | Bauer et al. | 701/467 |
| 8,274,406 B2* | 9/2012 | Karlsson et al. | 340/995.1 |
| 2004/0030570 A1 | 2/2004 | Solomon | |
| 2004/0036570 A1* | 2/2004 | Yu | 337/59 |
| 2004/0167667 A1* | 8/2004 | Goncalves et al. | 700/245 |
| 2006/0012493 A1* | 1/2006 | Karlsson et al. | 340/995.24 |
| 2007/0156286 A1* | 7/2007 | Yamauchi | 700/245 |
| 2008/0027591 A1* | 1/2008 | Lenser et al. | 701/2 |
| 2010/0049374 A1* | 2/2010 | Ferrin et al. | 701/1 |
| 2010/0256852 A1* | 10/2010 | Mudalige | 701/24 |
| 2010/0280754 A1* | 11/2010 | Goncalves et al. | 701/208 |
| 2011/0224844 A1* | 9/2011 | Farwell et al. | 701/2 |
| 2012/0191287 A1* | 7/2012 | Shin et al. | 701/28 |
| 2014/0246257 A1* | 9/2014 | Jacobsen et al. | 180/14.2 |

OTHER PUBLICATIONS

Long Qin, Yabing Zha, Quanjun Yin, Yong Peng. "Formation Control of Robotic Swarm Using Bounded Artificial Forces" The Scientific World Journal (2013).
Sabattini Lorenzo, Cristian Secchi, and Cesare Fantuzzi. "Arbitrarily Shaped Formations of Mobile Robots: Artificial Potential Fields and Coordinate Transformation," Autonomous Robots 30, No. 4 (2011) Abstract Only.

* cited by examiner

*Primary Examiner* — Tuan C. To
*Assistant Examiner* — Shardul Patel
(74) *Attorney, Agent, or Firm* — Richard C. Litman

(57) ABSTRACT

The robotic leader-follower navigation and fleet management control method implements SLAM in a group leader of a nonholonomic group of autonomous robots, while, at the same time, executing a potential field control strategy in follower members of the group.

8 Claims, 9 Drawing Sheets

ROBOTIC LEADER-FOLLOWER NAVIGATION AND FLEET MANAGEMENT CONTROL METHOD

BACKGROUND OF THE INVENTION

1. Field of the Invention

The present invention relates to robotics, and particularly to a robotic leader-follower navigation and fleet management control method.

2. Description of the Related Art

A robot generates its trajectory based on Simultaneous Localization and Mapping (SLAM). The mapping problem is addressed by using the current observations and the last available knowledge about the navigation environment. From the literature, simultaneous localization and mapping is used when a robot is placed at an unknown location in an unknown environment and requested to incrementally build a map of this unknown environment and use it to navigate autonomously. However, a problem remains in the implementation of SLAM to control a fleet of robots.

Researchers addressed fleet control by implementing a potential fields formation control strategy, but they considered a point mass robot. What is needed, however, is to extend the fields formation control strategy to make one of the robots lead the others in an unknown environment, and at the same time have all the agents in the fleet keep their formation shape based on the potential fields. Moreover it would be desirable to formulate a new framework extending previous work from point mass holonomic agents to nonholonomic vehicles.

Thus, a robotic leader-follower navigation and fleet management control method solving the aforementioned problems is desired.

SUMMARY OF THE INVENTION

The robotic leader-follower navigation and fleet management control method implements SLAM in a group leader of a nonholonomic group of autonomous robots, while, at the same time, executing a potential field control strategy in follower members of the group.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
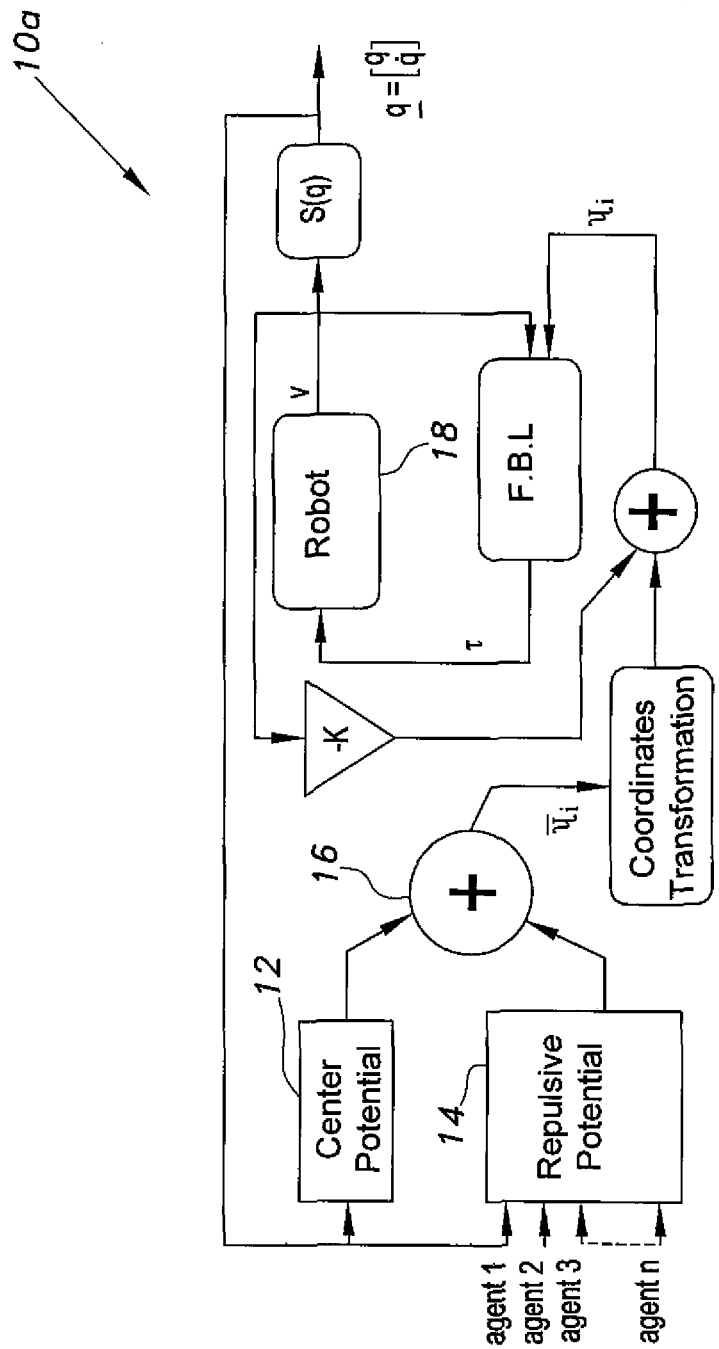
FIG. 1 is a block diagram of a system with known robotic dynamics.

At the outset, it should be understood by one of ordinary skill in the art that embodiments of the present method can comprise software or firmware code executing on a computer, a microcontroller, a microprocessor, or a DSP processor; state machines implemented in application specific or programmable logic; or numerous other forms without departing from the spirit and scope of the method described herein. The present method can be provided as a computer program, which includes a non-transitory machine-readable medium having stored thereon instructions that can be used to program a computer (or other electronic devices) to perform a process according to the method. The machine-readable medium can include, but is not limited to, floppy diskettes, optical disks, CD-ROMs, and magneto-optical disks, ROMs, RAMs, EPROMs, EEPROMs, magnetic or optical cards, flash memory, or other type of media or machine-readable medium suitable for storing electronic instructions.

The robotic leader-follower navigation and fleet management control method includes lead and follower robots utilizing car-like, nonholonomic (a holonomic robot is one where the number of degrees of freedom is equal to the number of actuators, e.g., independently steerable wheels) steering to perform Simultaneous Localization and Mapping (SLAM) while on exploratory missions. Generally, the mobile robot with a 2-dimensonal coordination space system and subjected to m constraints can be described in general coordinates (q) by:

$$M(q)\ddot{q} + V_m(q,\dot{q})\dot{q} + F(\dot{q}) + G(q) + \tau_d = B(q)\tau - A^T(q)\lambda, \quad (1)$$

where $M(q) \in \mathcal{R}^{n \times n}$ is the Symmetric Positive Definite (PD) inertia matrix, $V_m(q,\dot{q}) \in \mathcal{R}^{n \times n}$ is the Centripetal and coriolis matrix, $F(\dot{q}) \in \mathcal{R}^{n \times 1}$ is the Surface friction, $G(q) \in \mathcal{R}^{n \times 1}$ is the Gravitational vector, $\tau_d \in \mathcal{R}^{n \times 1}$ is the Unknown disturbance, $B(q) \in \mathcal{R}^{n \times r}$ is the Input transformation matrix, $\tau \in \mathcal{R}^{n \times 1}$ is the Input vector, $A^T(q) \in \mathcal{R}^{m \times n}$ is matrix associated with constraints, and $\lambda \in \mathcal{R}^{m \times 1}$ is the constraint forces vector. If we consider all kinematic equality constraints are not time-dependent, then:

$$A(q)\dot{q} = 0. \quad (2)$$

Let S(q) be a full rank matrix of a set of smooth and linearly independent vector fields in null space of A(q), then:

$$S^T(q)A^T(q) = 0. \quad (3)$$

If we consider equations (2) and (3), it will be possible to find a vector time function $v(t) \in \mathcal{R}^{n-m}$ such that:

$$\dot{q} = S(q)v(t). \quad (4)$$

Figure 3:
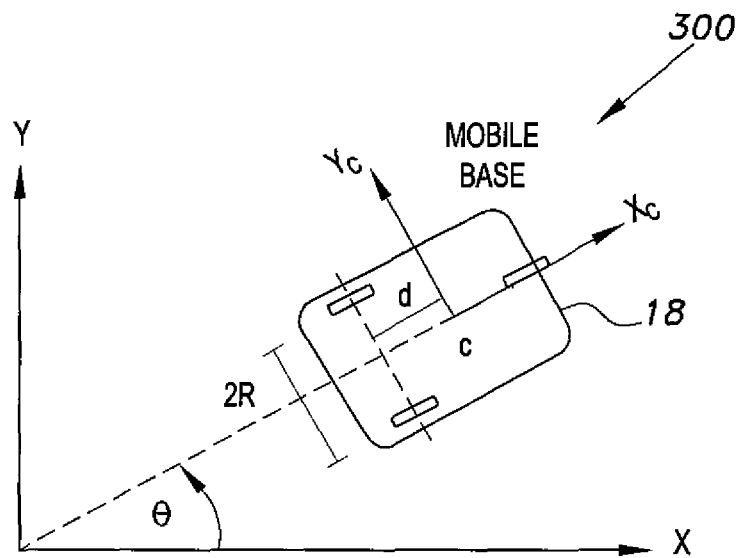
FIG. 3 is a schematic diagram of a robot in a 2-D coordinate system.

The position of the robot shown in FIG. 3 is in an inertial Cartesian frame {O, X, Y}, and it is presented by the vector $q=[x,y,\theta]^T$. The kinematic equations of the motion for equation (4) can be presented in terms of linear and angular velocities by:

$$S(q) = \begin{bmatrix} \cos(\theta) & -d\sin(\theta) \\ \sin(\theta) & d\cos(\theta) \\ 0 & 1 \end{bmatrix} \quad (5)$$

-continued $$v = \begin{bmatrix} v \\ \omega \end{bmatrix} = \begin{bmatrix} v_1 \\ v_2 \end{bmatrix} \quad (6)$$

$$\dot{q} = \begin{bmatrix} \dot{x} \\ \dot{y} \\ \dot{\theta} \end{bmatrix} = \begin{bmatrix} \cos(\theta) & -d\sin(\theta) \\ \sin(\theta) & d\cos(\theta) \\ 0 & 1 \end{bmatrix} \begin{bmatrix} v_1 \\ v_2 \end{bmatrix}. \quad (7)$$

The matrices that define the model dynamics based on FIG. 3 are expressed in equation (1), where:

$$M(q) = \begin{bmatrix} m & 0 & md\sin(\theta) \\ 0 & m & -md\cos(\theta) \\ md\sin(\theta) & -md\cos(\theta) & I \end{bmatrix} \quad (8)$$

$$V(q,\dot{q}) = \begin{bmatrix} -md\,\dot{\theta}^2\cos(\theta) \\ -md\,\dot{\theta}^2\sin(\theta) \\ 0 \end{bmatrix} \quad (9)$$

$$G(q) = 0 \quad (10)$$

$$B(q) = \frac{1}{r}\begin{bmatrix} \cos(\theta) & \cos(\theta) \\ \sin(\theta) & \sin(\theta) \\ R & -R \end{bmatrix} \quad (11)$$

$$\tau = \begin{bmatrix} \tau_1 \\ \tau_2 \end{bmatrix} \quad (12)$$

Now the system of equation (1) will be transformed to be appropriate for control consideration. To arrive at that, we need to differentiate equation (4) and substitute it into equation (1). We then multiply the resulting equation by $S^T$. The final motion equations of the nonholonomic mobile robot will be given as:

$$\dot{q} = Sv \quad (13)$$

$$S^T M S \dot{v} + S^T (M\dot{S} + V_m S) v + \overline{F} + \overline{\tau}_d = S^T B \tau, \quad (14)$$

where $v(t) \in \mathcal{R}^{n-m}$ is a vector of the velocity. Equation (14) will be rewritten as:

$$\overline{M}(q)\dot{v} + \overline{V}_m(q,\dot{q})v + \overline{F}(v) + \overline{\tau}_d = \overline{B}\tau \quad (15)$$

$$\overline{\tau} = \overline{B}\tau, \quad (16)$$

where $\overline{M}(q) \in \mathcal{R}^{r \times r}$ is a symmetric PD inertia matrix, $\overline{V}_m(q,\dot{q}) \in \mathcal{R}^{r \times r}$ is the centripetal and coriolis matrix, $\overline{F}(v) \in \mathcal{R}^{r \times 1}$ is the surface friction, $\overline{\tau}_d$ is an unknown disturbance, and $\overline{\tau} \in \mathcal{R}^{r \times 1}$ is an input vector.

Equation (15) describes the system behavior in the vehicle coordinates. This means S(q) is the transformation matrix, which transforms the velocities of the vehicle coordinates 'v' to Cartesian coordinates velocities $\dot{q}$.

TABLE 1

Vehicle parameters

| Parameter | Value | Unit |
|---|---|---|
| m | 10 | Kg |
| I | 5 | Kg-m$^2$ |
| R | 0.5 | m |
| r | 0.05 | m |

Figure 4:
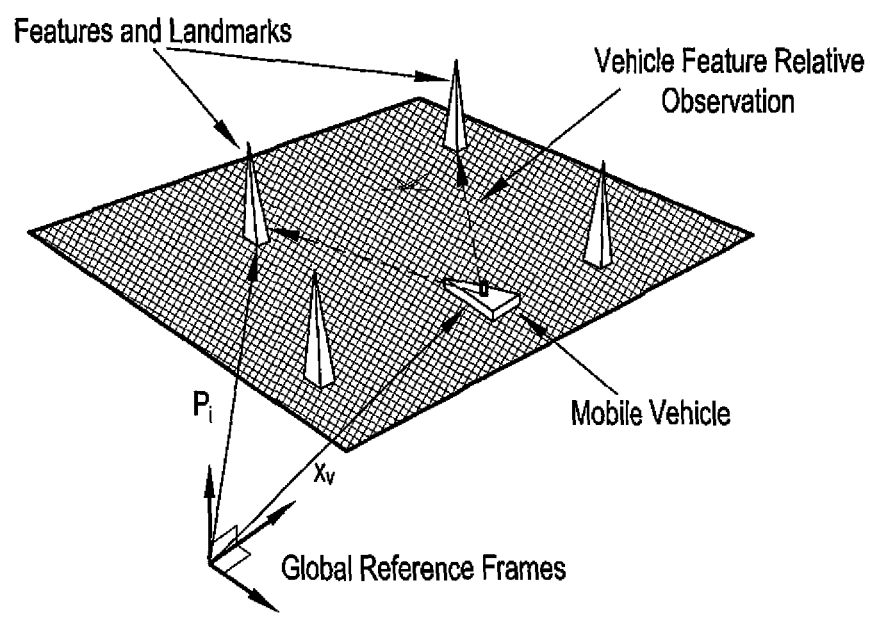
FIG. 4 is a contour map showing a robot and landmark relative positions with respect to a global reference frame.

The Simultaneous Localization and Mapping is a coupled problem of localization and mapping. This has a solution only if the two problems are processed together. With respect to the process model, the SLAM problem can be formulated by assuming a vehicle (mobile robot) that has a known kinematic model moving through an environment that is populated with a number of (features) landmarks. The vehicle has a sensor to measure the relative location between the vehicle and any one of the individual landmarks, as shown in FIG. 4. The state vector of the system contains the states of the vehicle model and all landmark positions (states). If we assume a linear discrete time model of the vehicle and its state is given as $x_v(k)$, then the vehicle process model is given as:

$$x_v(k+1) = F_v(k) + u_v(k+1) + w_v(k+1), \quad (17)$$

where $F_v(k)$ is the state transition matrix, $u_v(k)$ is control inputs vector, and $w_v(k)$ is a vector of uncorrelated process noise errors with zero mean and covariance $Q_v(k)$. Based on the assumption that the landmarks are static, its state transition equation will be:

$$P_i(k+1) = P_i(k) = P_i \quad (18)$$

If we have N landmarks, the state vector of all the landmarks is given as:

$$P = [P_1^T \ldots P_N^T]^T, \quad (19)$$

and the overall state vector for both the vehicle and landmarks is:

$$x(k) = [x_v^T(k) P_1^T \ldots P_N^T]^T. \quad (20)$$

The complete state transition model can be written as $$\begin{bmatrix} x_v(k+1) \\ P_1 \\ \vdots \\ P_N \end{bmatrix} = \begin{bmatrix} F_v(k) & 0 & \ldots & 0 \\ 0 & I_{P_1} & \ldots & 0 \\ \vdots & \vdots & \ddots & 0 \\ 0 & 0 & 0 & I_{P_N} \end{bmatrix} \begin{bmatrix} x_v(k) \\ P_1 \\ \vdots \\ P_N \end{bmatrix} + \begin{bmatrix} u_v(k+1) \\ 0_{P_1} \\ \vdots \\ 0_{P_N} \end{bmatrix} + \begin{bmatrix} w_v(k+1) \\ 0_{P_1} \\ \vdots \\ 0_{P_N} \end{bmatrix}, \quad (21)$$

where $I_{P_i}$ is the $\dim(P_i) \times \dim(P_i)$ identity matrix and $0_{P_i}$ is the $\dim(P_i)$ null vector.

With respect to an observation model, the vehicle has a sensor to measure the relative location between the vehicle and any one of the individual landmarks. Moreover, based on the assumption that the observations are linear, the observation model of any $i^{th}$ landmark will be written as:

$$z_i(k) = H_i x(k) + v_i(k), \quad (22)$$

$$z_i(k) = H_{pi} p - H_v x_v(k) + v_i(k), \quad (23)$$

where $v_i(k)$ is a vector of uncorrelated observation errors with zero mean and variance $R_i(k)$. $H_i$ is the observation matrix that relates the sensor output $z_i(k)$ to the state vector $x(k)$ when observing the $i^{th}$ landmark and is written in the form:

$$H_i = [-H_v, 0 \ldots 0, H_{pi}, 0 \ldots 0], \quad (24)$$

which says that we have relative observations between the landmark and the vehicle itself.

In the estimation process we need to estimate the state $x(k)$ based on our observations z. This will be easily achieved using the Kalman filter which will handle the function of estimation of landmarks and vehicle locations. The Kalman filter recursively calculates the estimation of the state $x(k)$ in accordance with the process and observations. The Kalman Filter proceeds through a prediction stage, an observation stage, and an update stage.

With respect to the prediction stage, At time k if the initial values of the estimate $\hat{x}(k|k)$ of the state $x(k)$ and the covariance estimate of $P(k|k)$ is initialized, the prediction can be calculated at time k+1 for state estimate as follows:

$$\hat{x}(k+1|k)=F(k)\hat{x}(k|k)+u(k), \quad (25)$$

and the observation (relative to the $i^{th}$ landmark) as:

$$\hat{z}_i(k+1|k)=H_i(k)\hat{x}(k+1|k), \quad (26)$$

and also the state covariance:

$$P(k+1|k)=F(k)P(k|k)F^T(k)+Q(k). \quad (27)$$

With respect to observation stage, after the prediction, the $i^{th}$ landmark observation is calculated based on the observation model (22). The innovation (the discrepancy between the actual measurement $z_k$ and the predicted measurement $\hat{z}_k$) is given as:

$$v_i(k+1)=z_i(k+1)-\hat{z}_i(k+|k), \quad (28)$$

and its covariance matrix is:

$$S_i(k+1)=H_i(k)P(k+1|k)H_i^T(k)+R_i(k+1). \quad (29)$$

The update of state estimate and its corresponding covariance are calculated as follows:

$$\hat{x}(k+1|k+1)=\hat{x}(k+1|k)+W_i(k+1)w_i(k+1), \quad (30)$$

$$P(k+1|k+1)=P(k+1|k)-W_i(k+1)S(k+1)W_i^T(k+1), \quad (31)$$

where $W_i(k+1)$ is the gain matrix, which is given by:

$$W_i(k+1)w_i=P(k+1|k)H_i^T(k)S^{-1}_i(k+1). \quad (32)$$

The state of our process, $x(k)$ needs to be estimated based on our measurement of $z(k)$. This is the exact definition of the Kalman filter. Kalman filter recursively computes the estimates of state $x(k)$, which is evolving according to the process and observation models. The filter proceeds in three stages prediction, observation and update as discussed above. Define a state $x(k)$ at time k that evolves from state $(k-1)$, and its measurement $z(k)$ is given by:

$$x(k)=Ax(k+1)+Bu(k-1)+w(k), \text{ (process model), and} \quad (33)$$

$$z(k)=Hx(k)+v(k), \text{ (observation model)}, \quad (34)$$

where A is the state transition model, B is the control input matrix, H is the observation matrix, which relates the measurement $z(k)$ to the state vector $x(k)$, w is the process noise, which is assumed to have a normal probability distribution with zero mean and covariance Q:

$$p(w) \sim N(0,Q), \quad (35)$$

and, v is the observation noise, which is assumed to have a normal probability distribution with zero mean and covariance R:

$$p(v) \sim N(0,R). \quad (36)$$

Table 2 presents the Kalman filter algorithm. If there is a nonlinearity in the system, the linear Kalman filter cannot deal with it. In situations like this, the extended Kalman filter can be used for estimation because it uses the linearized process model and the observation equations to predict the states.

TABLE 2

Kalman filter algorithm
Kalman Filter Algorithm

| | | |
|---|---|---|
| Prediction | Predicted state | $\hat{x}(k|k-1) = A(k)\hat{x}(k-1|k-1) + B(k)u(k-1)$ |
| | Predicted covariance | $P(k|k-1) = A(k)P(k-1|k-1)A(k)^T + Q(k)$ |
| Observation | Innovation | $\tilde{y}(k) = z(k) - H(k)\hat{x}(k|k-1)$ |
| | Innovation covariance | $S(k) = H(k)P(k|k-1)H(k)^T + R(k)$ |
| Update | Kalman gain | $K(k) = P(k|k-1)H(k)^T S(k)^{-1}$ |
| | Updated state | $\hat{x}(k|k) = \hat{x}(k|k-1) + K(k)\tilde{y}(k)$ |
| | Updated covariance | $P(k|k) = (I - K(k)H(k))P(k|k-1)$ |

Regarding the extended Kalman filter, if the nonlinearity is associated in the system, the Extended Kalman Filter (EKF) is used for estimation. In this case, the process is given as:

$$x(k)=f(x(k-1),u(k-1),w(k-1)), \quad (37)$$

and the observation model will be:

$$z(k)=h(x(k),v(k)), \quad (38)$$

where $f$, $h$ are non-linear functions. The process and observation vectors can be approximated without noise values $w(k)$ and $v(k)$ because in practice, the noise cannot be measured at each time step. The approximated process model:

$$\tilde{x}(k)=f(\hat{x}(k-1),u(k),0), \quad (39)$$

and approximated observation model:

$$\tilde{z}(k)=h(\tilde{x}(k),0), \quad (40)$$

and $\hat{x}(k)$: is some a posteriori estimate of the process state. For nonlinear process estimation, the system is needed to be linearized at the current state:

$$x(k)=\tilde{x}(k)+A(x(k-1)-\hat{x}(k+1)+Ww(k-1)), \quad (41)$$

$$z(k)=\tilde{z}(k)+J_h(x(k)-\tilde{x}(k))+Vv(k), \quad (42)$$

where $x(k)$ is the actual state vector, $z(k)$ is the measurement vector, $\tilde{x}(k)$ is the approximate state vector, $\tilde{z}(k)$ is the approximate measurement vector, $\hat{x}(k)$ is posteriori estimate of the state at step k, $w(k)$ is process noise, $v(k)$ is measurement noise, A is Jacobian matrix of partial derivatives of $f$ with respect to x, W is Jacobian matrix of partial derivatives of $f$ with respect to w, $J_h$ is Jacobian matrix of partial derivatives of h with respect to x, and V is Jacobian matrix of partial derivatives of h with respect to v. The extended Kalman filter algorithm is presented in Table 3.

TABLE 3

Extended Kalman filter algorithm
Extended Kalman Filter Algorithm

| | | |
|---|---|---|
| Prediction | Predicted state | $\hat{x}(k)^- = f(\hat{x}(k-1), u(k-1), 0)$ |
| | Predicted covariance | $P(k)^- = A(k)P(k-1)A(k)^T + W(k)Q(k-1)W(k)^T$ |
| Observation | Innovation | $\tilde{y}(k) = z(k) - H(k)$ |
| | Innovation covariance | $S(k) = J_h(k)P(k)^- J_h(k)^T + V(k)R(k)V(k)^T$ |
| Update | Kalman gain | $K(k) = P(k)^- J_h(k)^T S(k)^{-1}$ |
| | Updated state | $\hat{x}(k) = \hat{x}(k)^- + K(k)\tilde{y}(k)$ |
| | Updated covariance | $P(k) = (I - K(k)J_h(k))P(k)^-$ |

Regarding SLAM-based laser pose tracking for simple robot model, the problem of localization using laser scanning is addressed by updating the vehicle position information at high frequency. Using laser scanning information to detect landmarks is known by artisans having ordinary skill. A simple robot model is used for the modeling purpose. The robot position is defined in global coordinates and the direction control is represented in the robot coordinates. The robot is equipped with a laser sensor for range and bearing calculations between the autonomous robot and the landmarks. The landmarks are defined as $B_i$, i=1 . . . n, and the distance and bearing measurements are calculated based on the robot coordinates $(x_1, y_1)$ where:

$$z(k) = (r, \beta), \qquad (43)$$

in which r is the distance between LM and the laser and, β is the sensor bearing with reference to the robot coordinate frame. The vehicle and coordinate system 500 are shown in FIG. 5.

If the vehicle is controlled by its velocity V and the steering angle α with respect to the trajectory prediction of the vehicle back axle center, the process model will be:

$$\begin{bmatrix} \dot{x} \\ \dot{y} \\ \dot{\phi} \end{bmatrix} = \begin{bmatrix} V\cos(\phi) \\ V\sin(\phi) \\ \frac{V}{L}\tan(\alpha) \end{bmatrix} \qquad (44)$$

Figure 5:
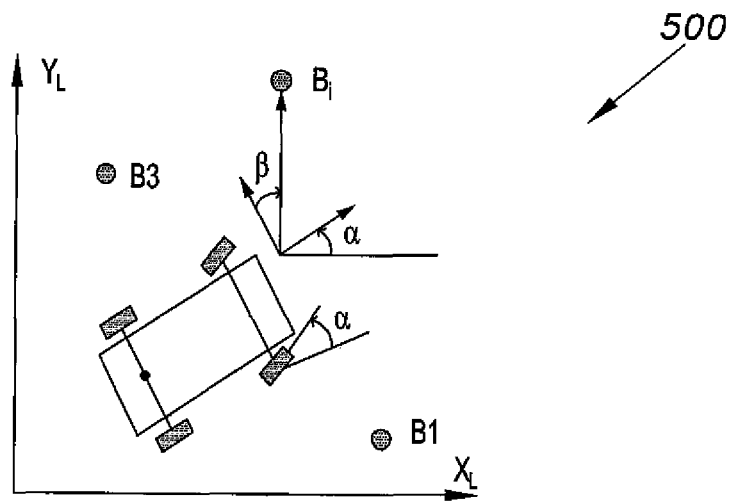
FIG. 5 is a schematic diagram of a robot and a sensor bearing with respect to a robot coordinate frame.
Figure 6:
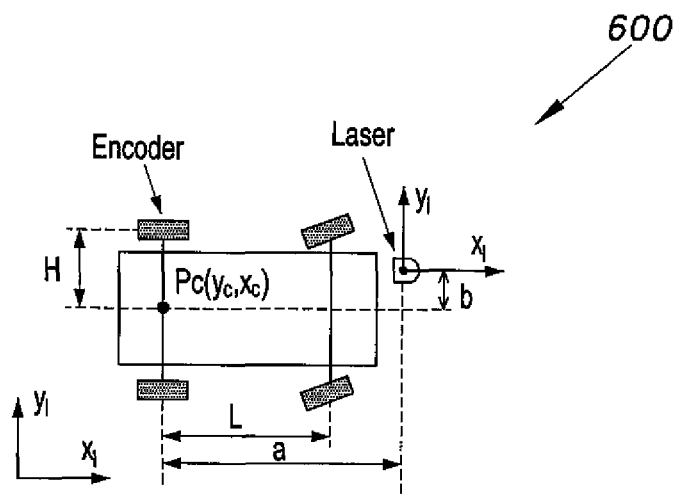
FIG. 6 is a schematic diagram showing robot model parameters.

For updating, the center of the back axle should be translated to represent the kinematic vehicle based on the trajectory of the laser center, as shown in the schematic drawings 500 and 600 of FIG. 5 and FIG. 6, respectively. The full state representation is written as follows:

$$\begin{bmatrix} \dot{x} \\ \dot{y} \\ \dot{\phi} \end{bmatrix} = \begin{bmatrix} V\cos(\phi) - \frac{V}{L}(a\cdot\sin(\phi) + b\cdot\cos(\phi))\cdot\tan(\alpha) \\ V\sin(\phi) + \frac{V}{L}(a\cdot\cos(\phi) - b\cdot\sin(\phi))\cdot\tan(\alpha) \\ \frac{V}{L}\tan(\alpha) \end{bmatrix}. \qquad (45)$$

Figure 7:
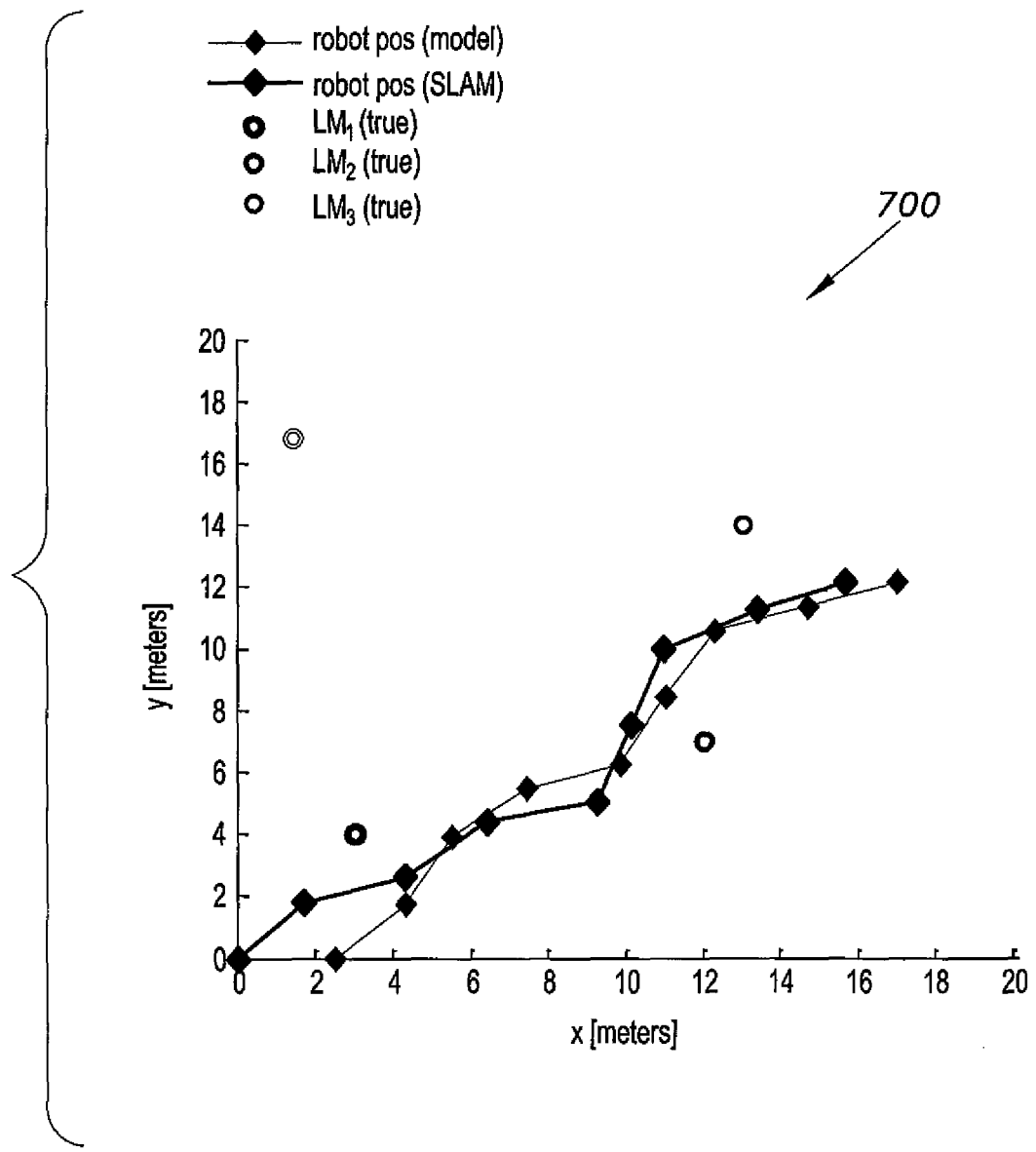
FIG. 7 is a plot showing full SLAM implementation in MATLAB.

The final discrete model in global coordinates is represented in the form:

$$\begin{bmatrix} x(k) \\ y(k) \\ \phi(k) \end{bmatrix} = \begin{bmatrix} x(c) + T\cdot V(c)\cos(\phi(c)) - \frac{V(c)}{L} \\ (a\cdot\sin(\phi(c)) + b\cdot\cos(\phi(c)))\cdot\tan(\alpha(c)) \\ y(c) + T\cdot V(c)\sin(\phi(c)) + \frac{V(c)}{L} \\ (a\cdot\cos(\phi(c)) + b\cdot\sin(\phi(c)))\cdot\tan(\alpha(c)) \\ \frac{V(c)}{L}\tan(\alpha(c)) \end{bmatrix}, \qquad (46)$$

where c=k−1 and T is the sampling time. The observation model is given by:

$$\begin{bmatrix} z_r^i \\ z_\beta^i \end{bmatrix} = \begin{bmatrix} \sqrt{(x_L - x_i)^2 + (y_L - y_i)^2} \\ \operatorname{atan}\left(\frac{(y_L - y_i)}{(x_L - x_i)}\right) - \phi + \frac{\pi}{2} \end{bmatrix}, \qquad (47)$$

where $(x_i, y_i)$ is the $i^{th}$ landmark position. The estimated position of the landmark becomes part of the process state vector. If the robot begins its navigation from an unknown place and obtains the environment measurements, this procedure will be used to incrementally build a map and localize the vehicle based on this map. Plot 700 of FIG. 7 shows the full SLAM implementation in MATLAB. An exemplary SLAM implementation is described in U.S. Pat. No. 8,274,406 issued on Sep. 25, 2012 to Karlsson, et al., which is hereby incorporated by reference in its entirety.

Potential fields are a useful strategy for formation control of a fleet of robots. One possible application of a group of robots is in the exploration of unknown environments. A group of mobile robots which moves inside an unknown environment can acquire much more information than single robot exploration.

The potential fields approach can be used as a formation control strategy, that can be applied to a group of robots moving in a two dimensional space. The main idea is to make a group of robots move in a formation of a desired shape. The formation control strategy considers a group of 'n' point mass holonomic agents described by the following dynamics:

$$\ddot{x}_i = u_i \; i = 1, \ldots, n, \qquad (48)$$

where $x_i \in \mathcal{R}^2$, is the $i^{th}$ agent's position. If the agents are needed to localize themselves on the circumcircle of a regular polygon, the distance between each two neighboring agents is equal to L, and the radius of the circumcircle of the polygon is $r$. The desired formation can be obtained by implementing the following control law:

$$u_i = f_{ci} + \sum_{j=1, j \neq i}^{n} f_{aij} - b\dot{x}_i \qquad (49)$$

$$f_{ci} = -\nabla_{x_i} V_{ci}(x_i), \qquad (50)$$

where $f_{ci}$ is the force between the center (leader) and follower i. This term is to keep each agent at distance $r$ from the center of the formation. Also, $$f_{aij} = \nabla_{x_i} V_{aij}(x_i, x_j) \qquad (51)$$

This term is used to regulate the distances between the agents. Thus, the summation of attractive and repulsive potentials can control the formation behavior. When all agents are at a distance $r$ from the group center, the control action at equation (50) is null. When the distances between each two neighboring agents is equal to L, the control action in equation (51) is null also.

In the desired group formation, the composition of these potential fields is null control action. In other words, the regular polygon formation means that the system is asymptotic stable. To get the desired formation, we consider our stable configuration shape is a regular polygon. Choose all the system energy as a Lyapunov candidate function '$\tilde{V}$' such that:

$$\tilde{V} = \sum_{i=1}^{n} \left[ E_{ci}(P_i) + \sum_{j=1; j \neq i}^{n} E_{aij}(P_i, P_j) + \frac{1}{2} v_i^T \overline{M} v_i \right], \qquad (52)$$

where $E_{ci}$ is the energy of the center potential and $E_{aij}$ is the energy of interagent potential. Then:

$$\tilde{V} = \sum_{i=1}^{n} [Pot_i + Kin_i] \qquad (53)$$

$$Pot_i = E_{ci}(P_i) + \sum_{j=1; j \neq i}^{n} E_{aij}(P_i, P_j) \qquad (54)$$

$$Kin_i = \sum_{i=1}^{n} \frac{1}{2} v_i^T \overline{M} v_i \qquad (55)$$

where $$P_i = \begin{bmatrix} x_i \\ y_i \\ \theta_i \end{bmatrix}; P_j = \begin{bmatrix} x_j \\ y_j \\ \theta_j \end{bmatrix}.$$

For the desired shape formation, the system will be stable if and only if the $\hat{V}(P_i) \geq 0$. The time derivative of a Lyapunov candidate function is '$\dot{\hat{V}}$':

$$\dot{\hat{V}}(P_i) = \sum_{i=1}^{n} \{[\nabla_{P_i} Pot_i]\dot{P}_i + [Kin_i]\dot{v}\} \qquad (56)$$

$$\dot{\hat{V}} = \qquad (57)$$

$$\sum_{i=1}^{n} \left[ \nabla_{P_i} E_{ci}(P_i) + \sum_{j=1; j \neq i}^{n} \nabla_{P_i} E_{aij}(P_i, P_j) \right] \dot{P}_i + \sum_{=1}^{n} \frac{\partial}{\partial V_i} \left[ \frac{1}{2} v_i^T \overline{M} v_i \right] \dot{v}_i$$

The cost function (52) will be used for analyzing the formation stability.

Figure 8:
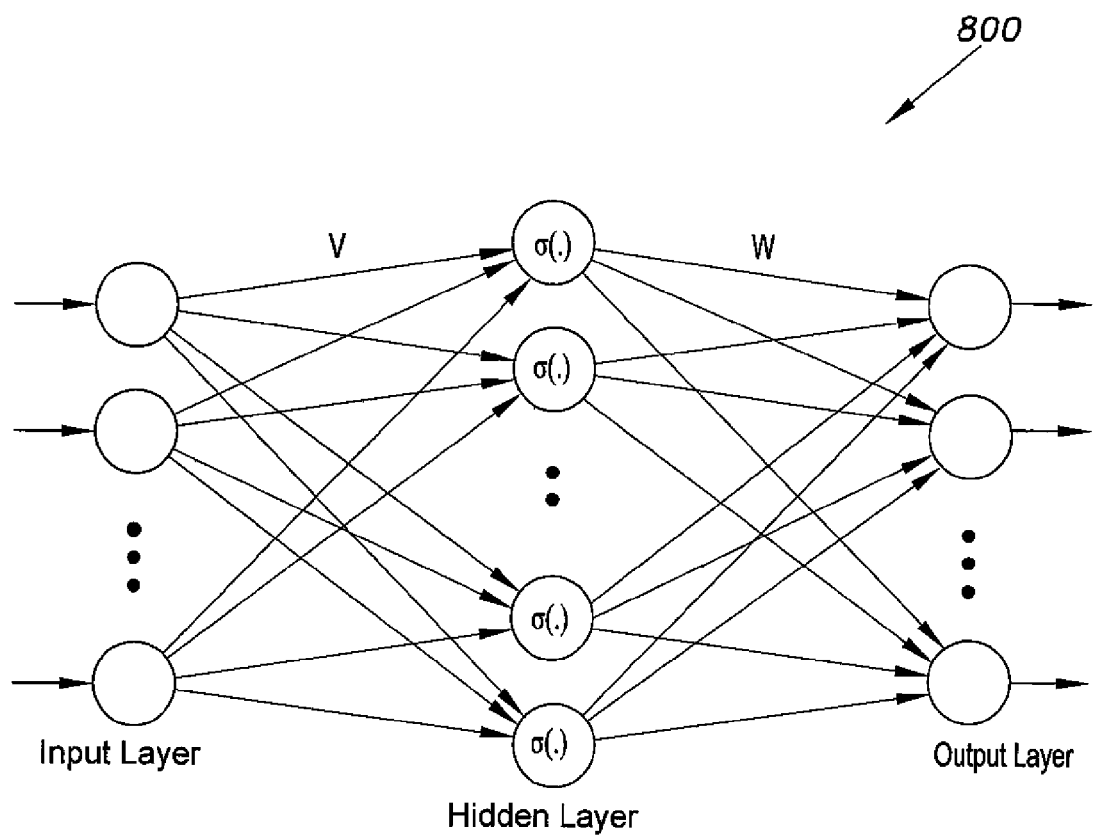
FIG. 8 is a schematic diagram showing a multilayer feed forward neural network used in a system where robot dynamics are unknown.

A neural network function is used as a powerful estimator to estimate the unmodeled dynamics in a nonholonomic mobile robot. Here the on-line neural network tuning algorithms are used to guarantee the vehicle's desired path tracking. The feed forward neural network 800 is shown in FIG. 8 has an input layer, a hidden layer, and an output layer. Its output is the vector y, and x is its input vector. The two layer neural network input output relation is given by the following formula:

$$y_i = \sum_{j=1}^{N_h} \left[ W_{ij} \sigma \left( \sum_{k=1}^{n} V_{jk} x_k + \theta_{vj} \right) + \theta_{wi} \right] \qquad (58)$$

where $y \in \mathcal{R}^m$, $x \in \mathcal{R}^n$, i=1, ..., m, σ(•) is the activation function, $N_h$ are the hidden layer neurons, $V_{jk}$ are weights of first interconnections, $W_{ij}$ are weights of second interconnections, and $\theta_{vj}$, $\theta_{wi}$ are Threshold offsets or 'bias'. Common activation functions known by artisans having ordinary skill include hard limit, symmetric hard limit, linear threshold, sigmoid (logistic curve), symmetric sigmoid, hyperbolic tangent, augmented ratio of squares, and radial basis function, i.e., Gaussian with variance v. The expression of neural network output formula can be written in the vector case as:

$$y = W^T \sigma(V^T x) \qquad (59)$$

The thresholds are included in the weight matrix as its first column.

One of the main neural network properties is the function approximation property, which is important for control purposes. If $f(x)$ is assumed to be a smooth function from $\mathcal{R}$ to $\mathcal{R}^m$, we can see that, when x is belongs to compact set $\mathcal{R}^s \in \mathcal{R}^n$ for a number of hidden layer neurons $N_h$, the weights and thresholds will be given as:

$$f(x) = W^T \sigma(V^T x) + \epsilon, \qquad (60)$$

where W and V are the ideal weights that will give a perfect $f(x)$ approximation, where $\epsilon$ is a bounded value of neural network approximation error.

From equation (60) we can conclude that the neural network can give an approximation for any smooth function in a compact set. Then the estimation of $f(x)$ is given by:

$$\hat{f}(x) = \hat{W}^T \sigma(\hat{V}^T x), \qquad (61)$$

where $\hat{W}$, $\hat{V}$ is the ideal neural network weight's estimation. These weights can be estimated by applying on-line tuning algorithms. The weight tuning algorithms used in literature were the gradient algorithms, which are built based on back-propagation algorithms. These weight tuning algorithms are provided by the following equations:

$$\dot{\hat{W}} = F\sigma(\hat{V}^T x) r^T \qquad (62)$$

$$\dot{\hat{V}} = Gx(\hat{\sigma}'^T \hat{W} r)^T \qquad (63)$$

where F and G are PD design matrices. In the case of sigmoid activation, the hidden layer gradient is:

$$\hat{\sigma}' = \text{diag}\{\sigma \hat{V}^T x\}[I - \text{diag}\{\hat{V}^T x\}]. \qquad (64)$$

The aim of the present method is to arrange a group of robots in a desired formation around their leader. In the ideal formation case the leader is assumed to be located in the center of the group. The formation proposed strategy is an extension of existing potential field control strategy with the difference that the model used in the present invention is a nonholonomic mobile robot instead of a holonomic point mass robot.

Assuming a fleet of n nonholonomic mobile robots with dynamics similar to those given in equations (1), the group leader coordinates are generated by running the SLAM algorithm. The group's leader is equipped with a simultaneous localization and mapping system (SLAM navigation unit).

The whole system includes two cascaded stages. The first one is the robot system which includes the system dynamics. The second stage is the potential fields formation controller. The general structure of the integrated system 10a is shown in FIG. 1 As shown in FIG. 1, the system utilizes feedback linearization (FBL) control. feedback linearization is a method for controlling the navigation of nonholonomic mobile robots and advantageously cancels the nonlinearities of the nonholonomic vehicles. The linearized system is valid for both navigation and group formation. Utilizing equations (15) and (16), The $i^{th}$ robot system should satisfy the following assumptions; (1) Boundedness: $\overline{M}_i(q)$, the norm of $\overline{V}_{m_i}(q,\dot{q})$, and $\overline{\tau}_d$ are bounded; (2) Skew Symmetric: The matrix $\overline{M}_i(q) - 2\overline{V}_{m_i}(q,\dot{q})$ is skew symmetric such that, $x^T (\overline{M}_i(q) - 2\overline{V}_{m_i}(q,\dot{q})) x = 0$. In the case that the surface friction $\overline{F}(v) = 0$ and unknown disturbance $\overline{\tau}_d = 0$, then:

$$\dot{v} = \overline{M}^{-1}(-\overline{V}_m(q,\dot{q})v + \overline{B}\tau), \qquad (65)$$

$$\dot{v} = -\overline{M}^{-1}\overline{V}_m(q,\dot{q})v + \overline{M}^{-1}\overline{B}\tau. \qquad (66)$$

Then, for feedback linearization, choose the input of the robot τ to be:

$$\tau = (\overline{M}^{-1}\overline{B})^{-1}(u_i + \overline{M}^{-1}\overline{V}_m(q,\dot{q})v), \qquad (67)$$

where $u_i$ is the vehicle frame proposed control signal that controls the whole system behavior, then by substituting equation (67) into equation (66) the robot system will be linearized to:

$$\dot{v} = u_i \qquad (68)$$

This means that the linear and the angular velocity of the robot can be controlled directly by the proposed control signal $u_i$, but all $\dot{v}$ dynamics in equation (68) is in the robot body frame representation, and the proposed control signal $\overline{u}_i$ is in general inertia frame. Now, we need to design a transformation filter to transform the control signal $\overline{u}_i$ to become more appropriate for controlling the robot body frame dynamics. We will start from the inertia frame coordinates. Therefore, we assume that:

$$A\ddot{q} = \overline{u} \qquad (69)$$

Because we are interested in x and y only, we define:

$$\Lambda = \begin{bmatrix} 1 & 0 & 0 \\ 0 & 1 & 0 \end{bmatrix}. \quad (5)$$

For coordinates transformation, this yields:

$$\dot{q} = Sv \quad (70)$$

The linearized robot system is $\dot{v}=u_1$. Differentiating equation (70) and substituting it for $\ddot{q}$ yields:

$$\Lambda\ddot{q} + \Lambda(\dot{S}v + \dot{v}S) \quad (71)$$

From equations (69 and (71), $\bar{u}$ will be given as:

$$\bar{u} = \Lambda(\dot{S}v + \dot{v}S) \quad (72)$$

$$\Rightarrow u_i = (\Lambda S)^{-1}(\bar{u} - \Lambda \dot{S}v) \quad (73)$$

Figure 9:
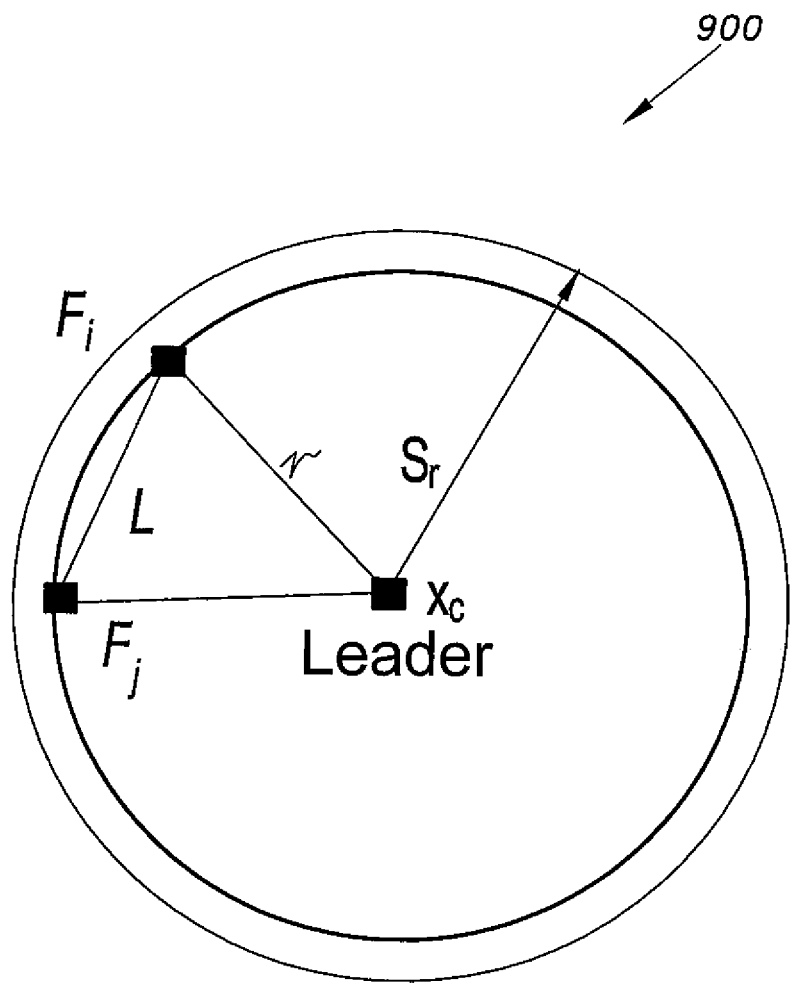
FIG. 9 is a plot of leader sensing range.

We assume that each robot has a sensing range equal to $S_r$ as shown in range plot 900 of FIG. 9, and each robot can know its neighbors' positions which are located inside its sensing area. All nonholonomic robots in the fleet need to navigate in a desired polygon shape. These robots localize themselves as followers around a moving leader. The distance between each two neighboring followers should be equal to $L \leq S_r$. The radius of the circumcircle of the desired polygon is equal to $r$. The coordinates of the moving leader is $x_c \in \mathcal{R}^2$ which can be generated by SLAM approach on the group leader. From the basics of the geometry, $r$ will be:

$$r = \frac{L}{2\sin(\pi/n)} \quad (74)$$

The control law will be implemented based on the attractive and repulsive potentials as well as the vehicle damping action. The desired behavior of the system will be obtained by using this control law:

$$u_i = P_{ce} + P_{ij} + Da, \quad (75)$$

where $P_{ce}$ is the center potential, $P_{ij}$ is the interagent potential (agent's potential), and $Da$ is the damping action.

A nonholonomic robot model, such as a car-like robot, is used in the present method. The complete attractive and repulsive potential field analysis for such a system is developed. The potential analysis includes $(x, y, \theta)$ where $(x, y)$ are the coordinates of the robot's center of mass in the inertial Cartesian frame $(X, Y)$, and $\theta$ is the orientation of the robot with respect to the inertial frame, see FIG. 3. In the case of a nonholonomic mobile robot, if the interest is $(x, y, \theta)$, the center potential is:

$$P_{att} = -\nabla_{P_i} V_{c_i}(P_i), \quad (76)$$

$$V_{c_i} = \frac{1}{2}K_c(R_{c_i} - r)^2, \quad (77)$$

where $R_{ci}(t) = \|P_i(t) - P_c\|$, $$P_i(t) = \begin{bmatrix} x_i(t) \\ y_i(t) \\ \theta_i(t) \end{bmatrix}, P_c = \begin{bmatrix} x_c \\ y_c \\ \theta_c \end{bmatrix}, \text{ and}$$

$$\Rightarrow R_{ci}(t) = \sqrt{(x_i(t) - x_c)^2 + (y_i(t) - y_c)^2 + (\theta_i(t) - \theta_c)^2}. \quad (78)$$

Thus, $$P_{att} = -\nabla_{pi} V_{ci}(P_i) - \frac{\partial V_{ci}}{\partial P_i} = -\left(\frac{\partial V_{ci}}{\partial R_{ci}} \cdot \frac{\partial R_{ci}}{\partial P_i}\right) \quad (79)$$

Differentiating equation (77) for $R_{ci}$ yields:

$$\frac{\partial V_{c_i}}{\partial R_{c_i}} = K_c(R_{c_i} - r). \quad (80)$$

Thus, if:

$$D = (x_i(t) - x_c)^2 + (y_i(t) - y_c)^2 + (\theta_i(t) - \theta_c)^2, \quad (81)$$

and $$R_{c_i} = D^{1/2}. \quad (82)$$

Now differentiate $R_{c_i}$ with respect to $P_i$ and use the chain rule, the result will be:

$$\frac{\partial R_{ci}}{\partial P_i} = \frac{\partial R_{ci}}{\partial D}\frac{\partial D}{\partial P_i}. \quad (83)$$

From equation (82), we obtain:

$$\frac{\partial R_{ci}}{\partial D} = \frac{1}{2}D^{-\frac{1}{2}}, \quad (84)$$

and $$\frac{\partial D}{\partial P_i} = \begin{bmatrix} \frac{\partial D}{\partial x_i} & \frac{\partial D}{\partial y_i} & \frac{\partial D}{\partial \theta_i} \end{bmatrix} = \quad (85)$$

$$[2(x_i(t) - x_c) \ 2(y_i(t) - y_c) \ 2(\theta_i(t) - \theta_c)] = 2[(P_i(t) - P_c)]^T,$$

Substituting equations (84) and (85) in (83) results in:

$$\frac{\partial R_{ci}}{\partial P_i} = \frac{1}{R_{ci}}[(P_i(t) - P_c)]^T. \quad (86)$$

The interagent potential between each two neighboring followers can be expressed as:

$$P_{ij} = -\nabla_{P_i} V_{ij}(P_i, P_j), \quad (87)$$

where $$R_{f_i}(t) = \|P_i(t) - P_j(t)\|, P_i(t) = \begin{bmatrix} x_i(t) \\ y_i(t) \\ \theta_i(t) \end{bmatrix}, P_j = \begin{bmatrix} x_j(t) \\ y_j(t) \\ \theta_j(t) \end{bmatrix} \quad (88)$$

$$V_{ij}(P_i, P_j) = \begin{cases} \frac{1}{2}K_a(R_{f_i} - L)^2, & R_{f_i} < L \\ 0, & \text{Otherwise} \end{cases}$$

where $R_{f_i}$ is the current distance between each two neighboring agents, $K_a$ is a positive constant, and $V_{ij}$ is continuously differentiable. If $R_{f_i}$<L this potential produces a repulsive force, and it will produce a null force if $R_{f_i} \geq L$. Suppose that:

$$R_{f_i} = \sqrt{[P_i(t) - P_j(t)]^T [P_i(t) - P_j(t)]}, \quad (89)$$

$$R_{f_j} = \sqrt{[P_j(t) - P_i(t)]^T [P_j(t) - P_i(t)]},$$

$$D_{f_i} = [P_i(t) - P_j(t)]^T [P_i(t) - P_j(t)], \quad (90)$$

$$= (x_i(t) - x_j(t))^2 + (y_i(t) - y_j(t))^2 + (\theta_i(t) - \theta_j(t))^2). \quad (91)$$

Whereas, the interagent potential between any two neighboring mobile robots is the force obtained by adding together the repulsive forces of all of them, for such an operation differentiating $D_{f_i}$ with respect to $P_i$ and $P_j$ is required.

$$\frac{\partial D_{f_i}}{\partial P_i} = \left[ \frac{\partial D_{f_i}}{\partial x_i} \frac{\partial D_{f_i}}{\partial y_i} \frac{\partial D_{f_i}}{\partial \theta_i} \right], \quad (92)$$

$$\frac{\partial D_{f_i}}{\partial P_i} = 2[(x_i(t) - x_j(t)) + (y_i(t) - y_j(t)) + (\theta_i(t) - \theta_j(t))], \quad (93)$$

and $$\frac{\partial D_{f_i}}{\partial P_j} = 2[(x_j(t) - x_i(t)) + (y_j(t) - y_i(t)) + (\theta_j(t) - \theta_i(t))]. \quad (94)$$

Taking the derivative of $R_{f_i}$ with respect to $P_i$ and $P_j$, then use the chain rule and insert $D_{f_i}$ so that:

$$\frac{\partial R_{f_i}}{\partial (P_i)} = \left( \frac{\partial R_{f_i}}{\partial D_{f_i}} \frac{\partial D_{f_i}}{\partial P_i} \right), \quad (95)$$

$$\frac{\partial R_{f_i}}{\partial D_{f_i}} = \frac{1}{2} D_{f_i}^{-1/2}, \quad (96)$$

$$\frac{\partial R_{f_i}}{\partial (P_j)} = \left( \frac{\partial R_{f_i}}{\partial D_{f_j}} \cdot \frac{\partial D_{f_j}}{\partial P_j} \right), \quad (97)$$

$$\frac{\partial R_{f_i}}{\partial D_{f_j}} = \frac{1}{2} D_{f_j}^{-1/2}. \quad (98)$$

Using equations (96), (93) in (95) gives:

$$\frac{\partial R_{f_i}}{\partial (P_i)} = \frac{1}{2} D_{f_i}^{-1/2} 2[(x_i(t) - x_j(t)) \ (y_i(t) - y_j(t)) \ (\theta_i(t) - \theta_j(t))] \quad (99)$$

$$= \frac{1}{2} D_{f_i}^{-1/2} [(P_i(t) - P_j(t))^T], \quad (100)$$

and using equations (98), (94) in (97), gives:

$$\frac{\partial R_{f_i}}{\partial (P_j)} = \frac{1}{2} D_{f_j}^{-1/2} 2[(x_j(t) - x_i(t)) + (y_j(t) - y_i(t)) + (\theta_j(t) - \theta_i(t))] \quad (101)$$

$$= \frac{1}{2} (D_{f_j})^{-\frac{1}{2}} 2[(P_j(t) - P_i(t))^T]. \quad (102)$$

The sum of equations (100) and (102) gives:

$$\frac{\partial R_{f_i}}{\partial (P_i, P_j)} = $$
$$(D_{f_i})^{-1/2} \begin{pmatrix} [(x_i(t) - x_j(t)) \ (y_i(t) - y_j(t)) \ (\theta_i(t) - \theta_j(t))] + \\ (D_{f_j})^{-1/2} [(x_j(t) - x_i(t)) \ (y_j(t) - y_i(t)) \ (\theta_j(t) - \theta_i(t))] \end{pmatrix}.$$

Hence:

$$\frac{\partial R_{f_i}}{\partial (P_i, P_j)} = [(D_{f_i})^{-1/2} (P_i(t) - P_j(t))^T + (D_{f_j})^{-1/2} (P_j(t) - P_i(t))^T]. \quad (103)$$

On the other hand, from equation (88), the derivative of $V_{ij}$ with respect to $d_{ij}$ is:

$$\frac{\partial V_{ij}}{\partial (d_{ij})} = K_a (R_{f_i} - L), \text{ when } R_{f_i} < L, \quad (104)$$

and using the chain rule to differentiate $V_{ij}$ with respect to $P_i, P_j$:

$$\frac{\partial V_{ij}}{\partial (P_i, P_j)} = \frac{\partial V_{ij}}{\partial R_{f_i}} \frac{\partial R_{f_i}}{\partial (P_i, P_j)}. \quad (105)$$

Substituting equations (103), (104) into equation (105) then leads to:

$$\frac{\partial V_{ij}}{\partial (P_i, P_j)} = K_a (R_{f_i} - L) \left[ (D_{f_i})^{-\frac{1}{2}} (P_i(t) - P_j(t))^T + (D_{f_j})^{-\frac{1}{2}} (P_j(t) - P_i(t))^T \right] \quad (106)$$

$$= K_a (R_{f_i} - L) \left[ \left( \frac{1}{R_{f_i}} \right) (P_i(t) - P_j(t))^T + \left( \frac{1}{R_{f_i}} \right) (P_j(t) - P_i(t))^T \right].$$

According to equation (89), we obtain:

$$R_{f_i} = -R_{f_j}. \quad (107)$$

Substituting equation (107) into equation (106) gives:

$$\frac{\partial V_{ij}}{\partial (P_i, P_j)} = \quad (108)$$
$$K_a (R_{f_i} - L) \left[ \left( \frac{1}{R_{f_i}} \right) (P_i(t) - P_j(t))^T - \left( \frac{1}{R_{f_i}} \right) (P_j(t) - P_i(t))^T \right].$$

The interagent potential is given by:

$$\therefore P_{ij} = -K_a (R_{f_i} - L) \frac{1}{R_{f_i}} [(P_i(t) - P_j(t))^T - (P_j(t) - P_i(t))^T]. \quad (109)$$

To get the desired formation, consider the stable configuration to be a regular polygonal shape. Choose the total energy of the closed loop system as a Lyapunov candidate function '$\tilde{V}$' so that:

$$\tilde{V} = \sum_{i=1}^{n}\left[V_{c_i}(P_i) + \sum_{j=1; j\neq i}^{n} V_{ij}(P_i, P_j) + \frac{1}{2}v_i^T \overline{M} v_i\right], \quad (110)$$

$$\tilde{V} = \sum_{i=1}^{n}[Pot_i + Kin_i], \quad (111)$$

$$Pot_i = V_{c_i}(P_i) + \sum_{j=1; j\neq i}^{n} V_{ij}(P_i, P_j), \quad (112)$$

$$Kin_i = \sum_{i=1}^{n} \frac{1}{2} v_i^T \overline{M} v_i. \quad (113)$$

For the desired shape formation, the system will be stable if and only if $\tilde{V}(P_i) \geq 0$, and the time derivative of a Lyapunov candidate function '$\dot{\tilde{V}} \leq 0$':

$$\dot{\tilde{V}}(P_i) = \sum_{i=1}^{n} \{[\nabla_{p_i} Pot_i]\dot{P}_i + [Kin_i]\dot{v}_i\}, \quad (114)$$

$$\dot{\tilde{V}}(P_i) = \quad (115)$$

$$\sum_{i=1}^{n}\left[\nabla_{P_i} V_{c_i}(P_i) + \sum_{j=1; j\neq i}^{n} \nabla_{P_i} V_{ij}(P_i, P_j)\right]\dot{P}_i + \sum_{=1}^{n} \frac{\partial}{\partial V_i}\left[\frac{1}{2}v_i^T \overline{M} v_i\right]\dot{v}_i.$$

Thus, we obtain:

$$\frac{\partial}{\partial V_i}\left[\frac{1}{2}v_i^T \overline{M} v_i\right]\dot{v}_i = v_i^T \overline{M} \dot{v}_i. \quad (116)$$

From (70) obtain $\dot{q}=Sv_i$. Also it is known that:

$$\dot{P}_i = \dot{q} = S_{v_i}, \quad (117)$$

$$\dot{v}_i = u_i. \quad (118)$$

Substitute equation (118) into equation (116) to obtain:

$$\frac{\partial}{\partial V}\left[\frac{1}{2}v_i^T \overline{M} v_i\right]\dot{v}_i = v_i^T \overline{M} u_i. \quad (119)$$

Now substitute equation (117) and equation (119) into equation (115).

$$\dot{\tilde{V}} = \sum_{i=1}^{n}\left[\nabla_{P_i} V_{c_i}(P_i) + \sum_{j=1; j\neq i}^{n} \nabla_{P_i} V_{ij}(P_i, P_j)\right]Sv_i + \sum_{=1}^{n} v_i^T \overline{M} u_i. \quad (120)$$

For simplicity, use $\nabla_{p_i} Pot_i$ instead of $[\nabla_{P_i} V_{c_i}(P_i) + \sum_{j=1; j\neq i}^{n} \nabla_{P_i} V_{ij}(P_i, P_j)]$, so that equation (120) becomes:

$$\dot{\tilde{V}} = \sum_{i=1}^{n}[\nabla_{p_i} Pot_i]Sv_i + \sum_{=1}^{n}(v_i^T \overline{M} u_i), \quad (121)$$

$$\Rightarrow \dot{\tilde{V}} = \sum_{i=1}^{n}\left(v_i^T S^T[\nabla_{p_i} Pot_i]^T\right) + \sum_{i=1}^{n}\left(\sum_{=1}^{n} v_i^T \overline{M} u_i\right). \quad (122)$$

For the desired configuration the system must be stable. For that choose the control $u_i$ as:

$$u_i = \overline{M}^{-1}[-S^T[\nabla_{p_i} Pot_i]^T - K_V v_i]. \quad (123)$$

Figure 10:
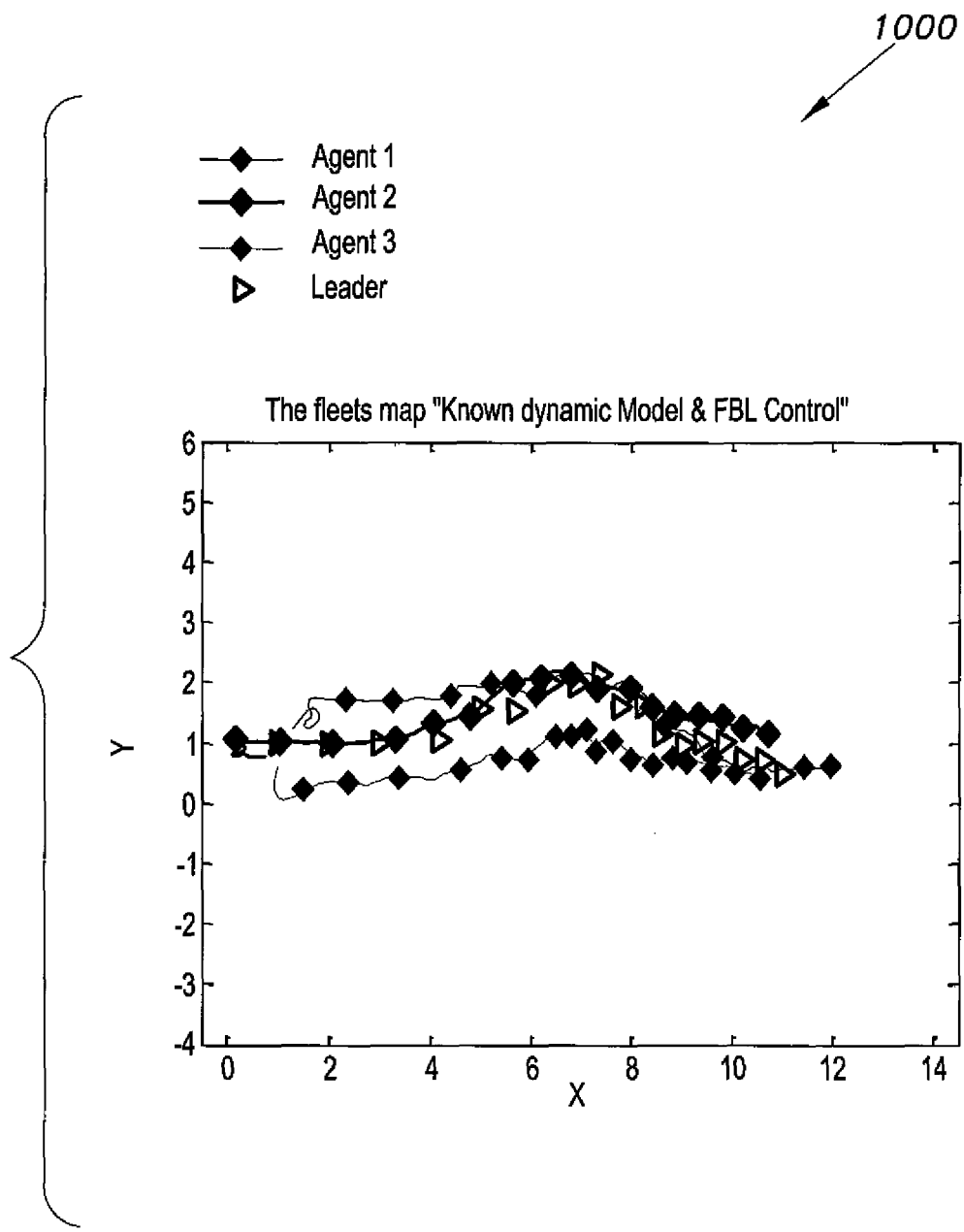
FIG. 10 is a plot showing a fleet map of three agents along navigation with leader under FBL control.

Substitute equation (123) into equation (122) and compute $\dot{\tilde{V}}$ to get:

$$\dot{\tilde{V}} = \quad (124)$$

$$\sum_{i=1}^{n}\left(v_i^T S^T[\nabla_{p_i} Pot_i]^T\right) + \sum_{i=1}^{n}\left(v_i^T \overline{M}(\overline{M}^{-1}[-S^T[\nabla_{p_i} Pot_i]^T - K_V v_i])\right)$$

$$\Rightarrow \dot{\tilde{V}} = \sum_{i=1}^{n}\left(v_i^T S^T[\nabla_{p_i} Pot_i]^T\right) + \sum_{i=1}^{n}(v_i^T([-S^T[\nabla_{p_i} Pot_i]^T - K_V v_i]))$$

$$\Rightarrow \dot{\tilde{V}} = \sum_{i=1}^{n}\left(v_i^T S^T[\nabla_{p_i} Pot_i]^T\right) - \sum_{i=1}^{n}\left(v_i^T S^T[\nabla_{p_i} Pot_i]^T\right) - \sum_{i=1}^{n} v_i^T K_V v_i,$$

whereby:

$$\Rightarrow \dot{\tilde{V}} = -\sum_{i=1}^{n} v_i^T K_V v_i \leq 0, \quad (125)$$

which proves stability. The performance of FBL controller 10a is shown as plot 1000 of FIG. 10.

Figure 2:
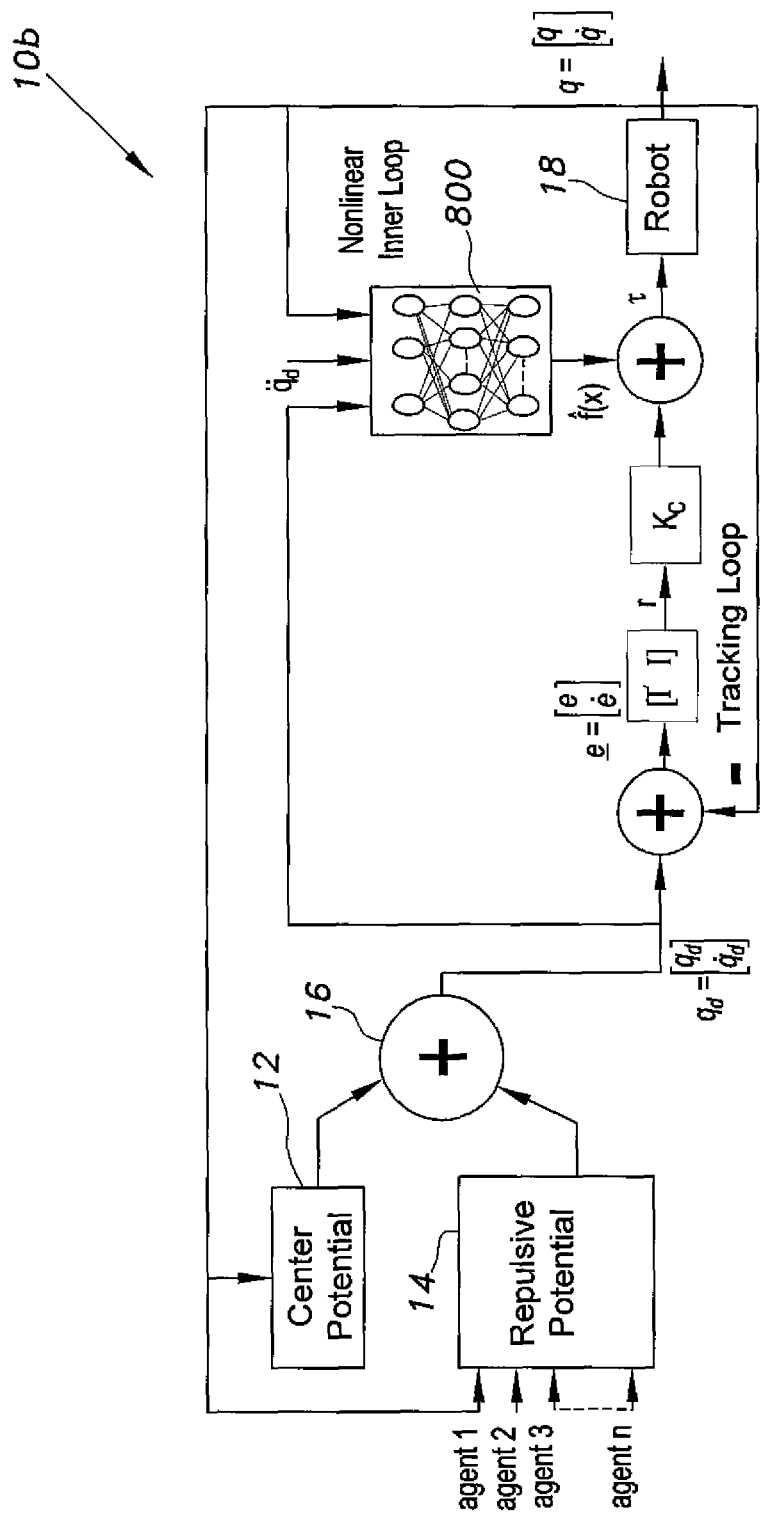
FIG. 2 is a block diagram of a system with unknown robotic dynamics.

In practice, the robot dynamics or parameters in many applications may be unknown or changing with time. In such cases the aforementioned controller is modified to controller configuration 10b, as shown in FIG. 2. In controller 10b, on-line neural network (NN) weight tuning algorithms guarantee tracking a desired following path and error dynamics. The follower will localize itself on its desired trajectory based on the potential fields effect.

For unknown robot dynamics the present method utilizes a framework combination of two stages. The first combination comprises potential field 12 and repulsive potential field 14 utilizing a combiner 16 in an outer loop to provide a formation controller for robot 18. The second combination comprises the NN 800 in an inner loop to provide a controller for robot 18 which guarantees tracking the desired path and modeling the dynamics of robot 18. The robot has to follow its desired trajectory $q_d$. The tracking error E(t) is the difference between the desired path trajectory $q_d$ and the estimated trajectory q, as follows:

$$E(t) = q_d(t) - q(t), \quad (126)$$

where:

$$q_d = \begin{bmatrix} x_f \\ y_f \end{bmatrix} \text{ and } q = \begin{bmatrix} x \\ y \end{bmatrix}, \quad (127)$$

and the filtered tracking error is given by:

$$r(t) = \dot{e} - \Gamma e, \quad (128)$$

where $\Gamma > 0$: is a PD design parameter matrix. By using equation (1) and differentiating equation (128), the dynamics of the robot can be written in terms of filtered error as:

$$M\dot{r} = -V_m r - \tau + f + \tau_d, \quad (129)$$

where $f$ is the nonlinear robot function, which is equal to:

$$f(x) = M(q)(\ddot{q}_d - \Gamma \dot{e}) + V_m(q, \dot{q})(\dot{q}_d + \delta e) + G(q) + F(\dot{q}). \quad (130)$$

To compute $f(x)$, we define the vector x:

$$x = [e^T \; \dot{e}^T \; q_d^T \; \dot{q}_d^T \; \ddot{q}_d^T]^T \quad (131)$$

where x can be measured. The appropriate controller can be used for the path following is derived by setting:

$$\tau = \hat{f}(x) + K_c r; \quad (132)$$

where $K_c = K_c^T$ is the gain matrix, and $K_c r$ is the outer PD tracking loop, and $\hat{f}(x)$ is the estimate of $f(x)$. Using the controller characterized by equation (132), the closed loop error dynamics is given by:

$$M\dot{r} = -(K_c + V_m)r + \tilde{f} + \tau_d. \quad (133)$$

The functional estimated error $\tilde{f}$ is:

$$\tilde{f} = f - \hat{f}. \quad (134)$$

The controller characterized by equation (132) will minimize the tracking error based on selecting an appropriate gain value for $K_c$, and estimating $\tilde{f}$. The error r(t) and the control signals should be bounded. As shown in FIG. 2, controller 10b uses PD control in the outer tracking loop and neural network (NN) 800 forming control in the inner loop to estimate the robot function $f(x)$. The NN controller structure is selected as:

$$\tau = \hat{W}\sigma(\bar{V}^T x) + K_c r. \quad (135)$$

Figure 11:
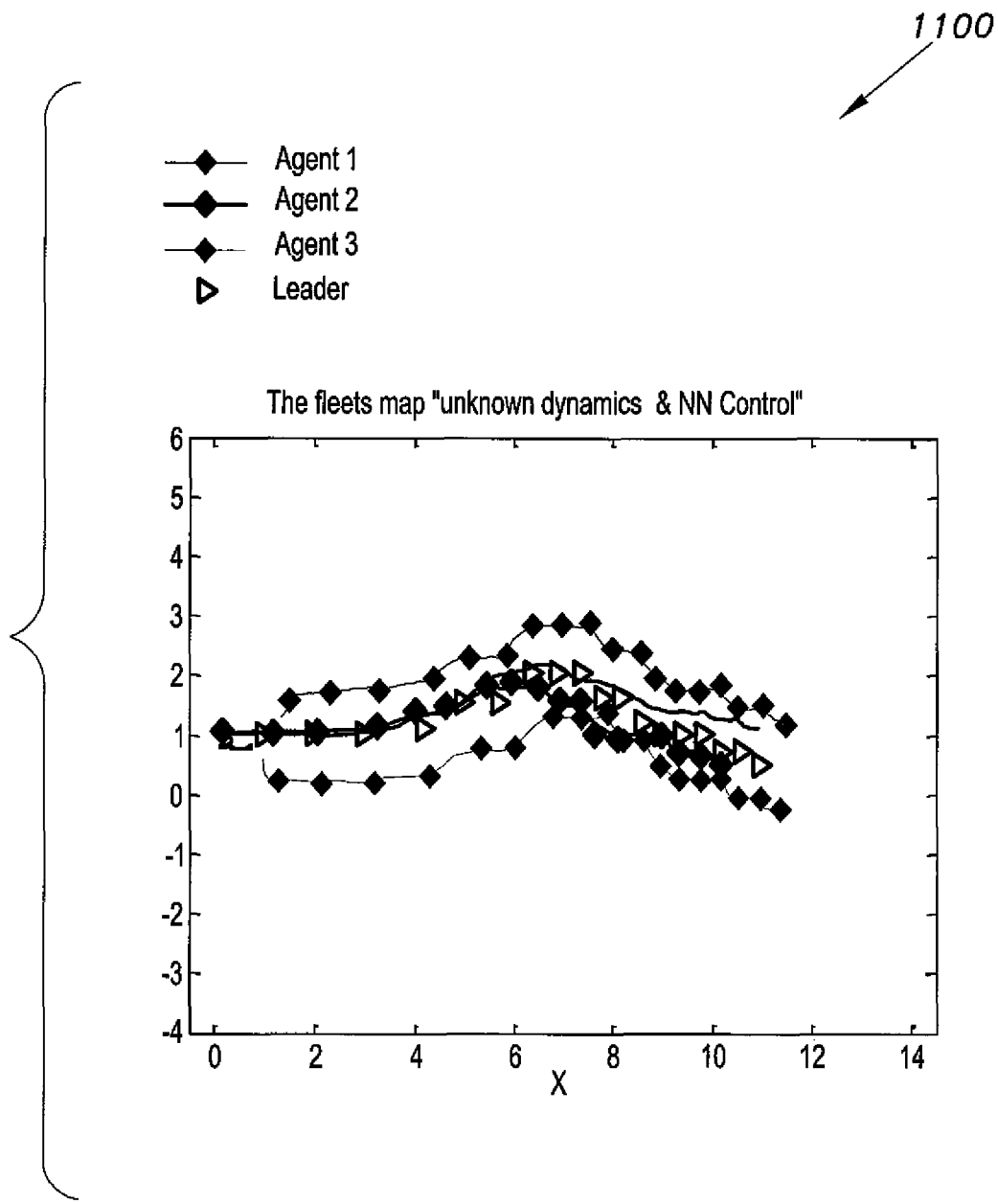
FIG. 11 is a fleet map of three agents along navigation with the leader under NN control.

Tuning weights of NN 800 can be selected by using equation (133) and selecting $K_c$ which can stabilize the filtered tracking error r(t). For the whole system to be stable the outer formation loop must be slower than the inner robot stabilization loop. The performance of controller 10b using NN 800 for nonlinear inner loop control is shown as plot 1100 of FIG. 11.

It is to be understood that the present invention is not limited to the embodiments described above, but encompasses any and all embodiments within the scope of the following claims.

We claim:

1. A robotic leader-follower navigation and fleet management control method, comprising the steps of:
    performing Simultaneous Localization and Mapping (SLAM) in a group leader of a nonholonomic group of autonomous robots using at least one sensor, the SLAM generating a map of landmarks in an environment;
    the group leader localizing itself with respect to the map to navigate the environment;
    executing potential field formation control in follower members of the nonholonomic group of autonomous robots;
    computing a desired formation of the autonomous robots by utilizing a control law characterized by the relation $$u_i = f_{ci} + \sum_{j=1, j \neq i}^{n} f_{aij} - b\dot{x}_i$$

and $$f_{ci} = -\nabla_{x_i} V_{ci}(x_i),$$

where $f_{ci}$ represents a force between a center of the desired formation, represented by a position of the group leader, and an i-th one of the follower members, wherein the force maintains each of the follower members at a radius of a circle circumscribing a polygon at a distance $r$ from the center of the desired formation; and
    the follower members following the group leader in a predefined formation pattern based on the desired formation and the potential field with respect to each other and with respect to the group leader.

2. The robotic leader-follower navigation and fleet management control method according to claim 1, wherein the steps of claim 1 are performed when dynamics of the autonomous robots are known.

3. The robotic leader-follower navigation and fleet management control method according to claim 1, further comprising the step of utilizing an outer control loop and an inner control loop to execute the field formation control.

4. The robotic leader-follower navigation and fleet management control method according to claim 3, further comprising the steps of:
    forming a center potential field as a component of the outer control loop;
    forming a repulsive potential field as a component of the outer control loop;
    summing the center potential and the repulsive potential to provide a net vehicle frame control signal $\bar{u}_l$ in the outer control loop;
    performing a coordinate transformation based on $\bar{u}_l$;
    forming a sum comprising an output of the coordinate transformation plus a feedback gain of the inner control loop;
    performing feedback linearization control in the inner control loop based on the sum of the coordinate transformation and the inner control loop feedback gain, and based on a velocity v of the autonomous robot, output of the feedback linearization being fed as an inner loop control signal to the autonomous robot;
    closing the outer control loop with a signal S(q) fed back to be used as input to the center potential forming step and as input to the repulsive potential forming step, S(q) being based on the v output of the autonomous robot and a rate of change $\dot{q}$ of a vector q having 2-D coordinate components x and y and a wheel angle component $\theta$, where $S(q) = (v(t))/\dot{q}$.

5. The robotic leader-follower navigation and fleet management control method according to claim 4, wherein the steps of claim 4 are performed for each of the follower members.

6. The robotic leader-follower navigation and fleet management control method according to claim 3, further comprising the steps of:
    forming a center potential field as a component of the outer control loop;
    forming a repulsive potential field as a component of the outer control loop;
    summing the center potential and the repulsive potential to provide a desired trajectory control signal $q_d$ in the outer control loop;
    forming a tracking error based on summing the desired trajectory control signal $q_d$ and an inner loop tracking estimation q;
    filtering the tracking error;
    applying an inner loop gain constant $K_c$, to the filtered tracking error to provide a gain-adjusted, filtered tracking error;
    estimating nonlinear dynamics of the autonomous robot in the inner control loop based on motion output of the autonomous robot, the desired trajectory $q_d$ and the second derivative $\ddot{q}_d$ of the desired trajectory, the nonlinear dynamics estimate forming a function $f(x)$ of the robot summed with the gain-adjusted filtered tracking error to complete the inner control loop, the outer loop being completed by feeding the motion output of the autonomous robot back as input to the center potential forming step and as input to the repulsive potential forming step.

7. The robotic leader-follower navigation and fleet management control method according to claim 6, wherein the steps of claim 6 are performed for each of the follower members.

8. The robotic leader-follower navigation and fleet management control method according to claim 6, wherein the nonlinear dynamics estimate in the inner control loop is performed by a neural network.

* * * * *